No. 630,090. Patented Aug. 1, 1899.
J. W. NASMITH.
STEAM TRAP.
(Application filed Feb. 18, 1899.)
(No Model.)
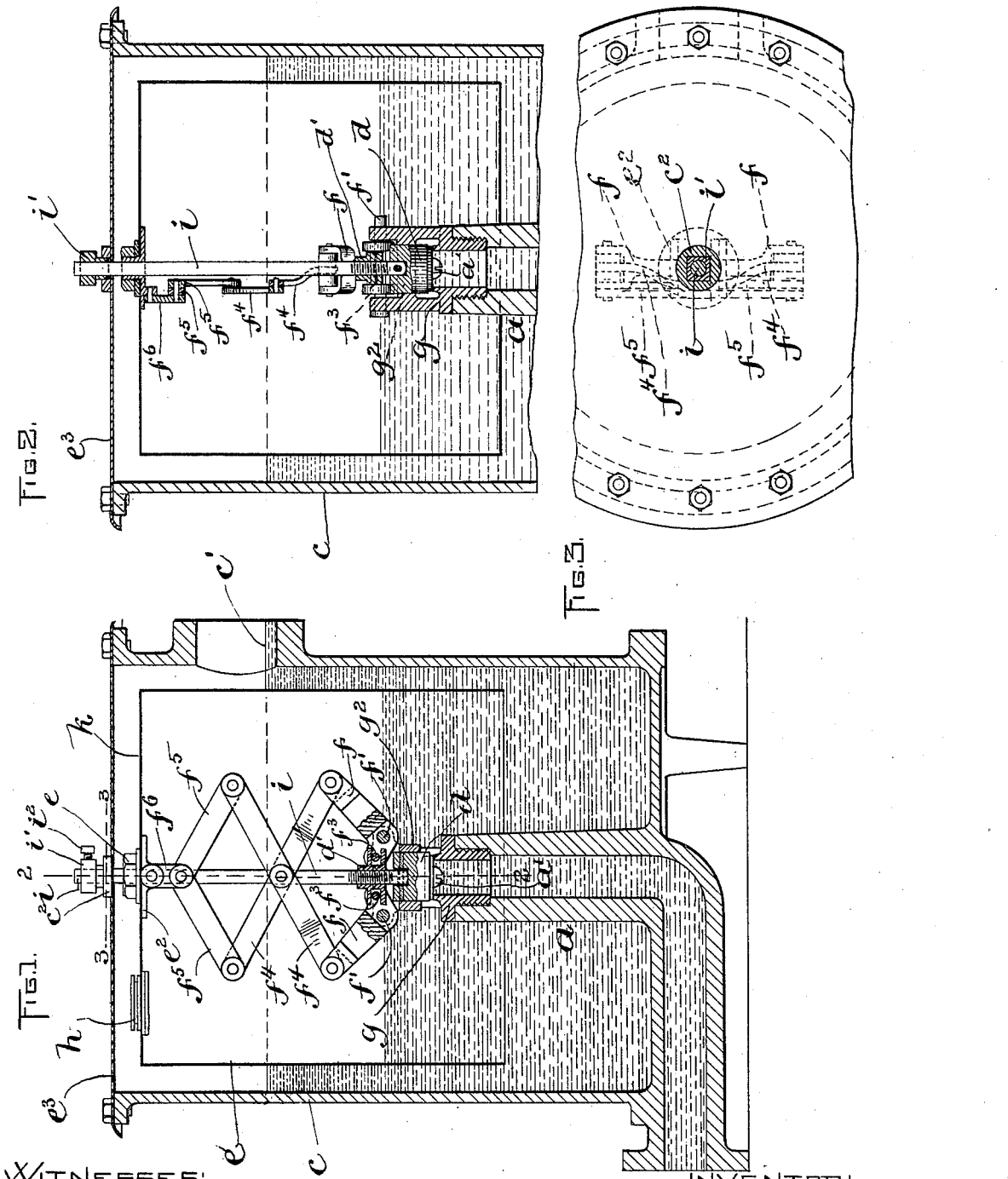
WITNESSES:
A. D. Harrison
P. W. Pezzetti
INVENTOR:
John Wm. Nasmith
by Wright, Brown & Quinby, Attys.

UNITED STATES PATENT OFFICE.

JOHN WILLIAM NASMITH, OF MANCHESTER, ENGLAND.

STEAM-TRAP.

SPECIFICATION forming part of Letters Patent No. 630,090, dated August 1, 1899.

Application filed February 18, 1899. Serial No. 705,967. (No model.)

*To all whom it may concern:*

Be it known that I, JOHN WILLIAM NASMITH, of Manchester, England, have invented certain new and useful Improvements in Steam-Traps, of which the following is a specification.

This invention is an improvement on the steam-trap shown in United States Letters Patent No. 608,384, granted to Victor Aimé Prost August 2, 1898, said trap comprising a water-receptacle, a conduit for steam and water entering the said receptacle and having an outlet therein, a float having a vertical movement in the receptacle and inclosing said outlet, a valve located within the float and adapted to open and close the outlet, and devices which coöperate with the float to operate the valve when said float rises and falls. In the trap shown in the said patent the valve was carried at the lower end of a screw and the float in rising and falling was caused to rotate in order to operate this screw, and thereby seat and unseat the valve. The necessary mechanism incident to this arrangement operated with considerable friction and would sometimes impair the perfect working of the trap.

The present invention contemplates the employment of mechanism inclosed within the float for operating the valve; and it has for its object to provide an improved device for guiding the float and valve-operating mechanism and adjusting the valve, said mechanism being so constructed that the valve may be adjusted from outside without removing the float.

The invention consists in the novel features of construction and arrangement which I shall now proceed to describe and claim.

Of the accompanying drawings, forming a part of this specification, Figure 1 represents a vertical sectional view of a steam-trap constructed in accordance with my invention. Fig. 2 represents a section on line 2 2 of Fig. 1. Fig. 3 represents a section on line 3 3 of Fig. 1.

The same reference characters indicate the same parts in all the figures.

Referring to the drawings, $a$ represents a conduit which receives water and steam from a boiler or system of piping through a suitable pipe, said conduit being here shown as having a substantially horizontal portion and a substantially vertical portion, the latter being secured to and passing through the bottom of a receptacle $c$. The conduit $a$ has an outlet $a'$, surrounded by a valve-seat, on which a valve $d$ is adapted to close to prevent the escape of steam through the outlet $a'$. When the valve is opened, matter passing through the outlet $a'$ escapes into the receptacle $c$.

$e$ represents a bell or float adapted to rise and fall in the receptacle $c$, said float being closed at its upper end and opened at its lower end and having in its top wall a valve-opening or socket occupied by a light valve $h$, which when depressed by its own weight permits the escape of air or vapor from the interior of the float. The said top wall may also be provided with a small vent $k$ for the escape of air.

$g$ represents an annular yoke or nozzle in which the outlet $a'$ is located, said yoke being formed with upwardly-projecting ears $g'$ $g'$ on either side of the valve $d$ and having an annular guide or collar $g^2$ for said valve. At the top of the ears $g'$ $g'$, pivoted to studs $f'$ $f'$, are levers $f$ $f$, diverging toward opposite sides of the float $e$. At their inner ends said levers carry pins $f^3$ $f^3$, engaged with notches in the ends of a block or nut $d'$, through which screws a threaded rod $i$, attached at its lower end below the nut $d'$ to the valve $d$ by means of a pin, the connection being made so that the end of the rod will bear the upward pressure of the valve, as represented in Fig. 2. The outer ends of the levers $f$ $f$ are pivotally connected with levers $f^4$ $f^4$, which are crossed at their middle points and pivotally connected thereat, and the pivoted levers $f^4$ are in turn pivoted or connected at their upper ends with a third set of levers $f^5$ $f^5$, pivotally connected to a link $f^6$. The link in turn is pivoted to a boss or rose $e^2$, attached to the top or roof of the float $e$. The arrangement forms what are commonly known as "lazy-tongs," which when extended will cause a downward movement of the valve to its seat. When the lazy-tongs are contracted or flattened out, the valve is raised from its seat. It will readily be seen that the up-and-down movement of the float will produce such an extension and contraction and a consequent operation of the valve.

The threaded rod $i$ is prolonged upwardly through the top of the float $e$, having a sliding bearing $e'$ therein, which may be provided with a gland or packing. The top of the rod projects through an aperture in the cover $c^3$ of the receptacle $c$ and has attached to its upper end, by means of a set-screw $i^2$, a block $i'$. The said block has a squared lower end fitting in a square socket in a boss $c^2$, attached to the cover $c^3$, the arrangement permitting the rod $i$ to rise and fall, but normally preventing it from turning.

The operation of the above-described apparatus is as follows: The receptacle $c$ is first filled with water up to the level of its outlet or overflow $c'$. The connection between the conduit $a$ and the pipe or boiler may then be opened and the steam turned on. The float $e$ being depressed, and the valve $d$ consequently open, the air which is driven before the steam escapes from the conduit $a$ into the float $e$ and from thence into the receptacle $c$ through the small valve $h$ in the top of the float. Water follows the air and is added to the supply already in the receptacle $c$, causing an overflow through the outlet $c'$, the water finding its way under the lower end of the float $e$. The water gradually becomes hotter and hotter, heating the vertical portion of the conduit $a$ until by the time the water in immediate contact with the steam arrives in the lower portion of said conduit the water surrounding the vertical portion of the conduit is above the boiling-point, and low-pressure steam is given off within the float $e$ in sufficient quantity to close the valve $h$ and raise the float and close the valve $d$. The inflow being checked, and the temperature of the water is reduced, and the pressure being reduced within the float $e$ the said float falls by its own weight, causing the opening of the valve $d$ and letting more water escape from the conduit into the receptacle $c$. These oscillations of the float continue for a few minutes, gradually diminishing in amplitude until the float assumes a fixed position and remains stationary. The whole apparatus is then in equilibrium, the valve $d$ having adjusted itself and regulated the outlet of the conduit so as to just permit under the pressure of the steam, whatever it may be, the outflow of the water of condensation at the same rate as that at which it forms, no more nor less being allowed to flow. The rod $i$ guides the float and its contained mechanism during the vertical movements of said float and also provides a means for adjusting the valve $d$ to regulate its distance from the valve-seat surrounding the outlet $a'$. When said adjustment becomes necessary, the set-screw $i^2$, fixing the block $i'$ to the upper end of the rod, is loosened, and said rod is turned a sufficient distance to effect the required adjustment, and the said screw is then retightened, preventing a further turning of the rod and fixing the valve at the required adjustment. The nut $d'$ being of rectangular form and confined between the ears $g'$ is prevented by such confinement and by its engagement with the ends of the levers $ff$ from turning when the rod $i$ is turned.

I claim—

1. A steam-trap comprising a water-receptacle, a conduit for steam and water, having an outlet in said receptacle, a float movable within the receptacle and inclosing said outlet, a valve located within the float and adapted to open and close the outlet, a connection between the float and valve whereby the movements of the float operate the valve, a rod connected with the valve and passing through the float, and a guide for said rod outside of the float.

2. A steam-trap comprising a water-receptacle, a conduit for steam and water having an outlet within said receptacle and inclosing said outlet, a valve located within the float and adapted to open and close the outlet, a connection between the float and valve, whereby the movements of the float operate the valve, said connection including a block or nut, and a threaded rod screwing through said nut and attached to the valve, said rod being prolonged through the wall of the float and having a sliding bearing therein, and means outside of the float for guiding said rod, said means being constructed to normally prevent the rod from turning.

In testimony whereof I have affixed my signature in presence of two witnesses.

JOHN WILLIAM NASMITH.

Witnesses:
RICHD. S. HARPER,
WILLIAM GRAHAM.